June 14, 1960 E. D. HINDENBURG 2,940,343
WIRE STRIPPER
Filed April 26, 1957 2 Sheets-Sheet 1
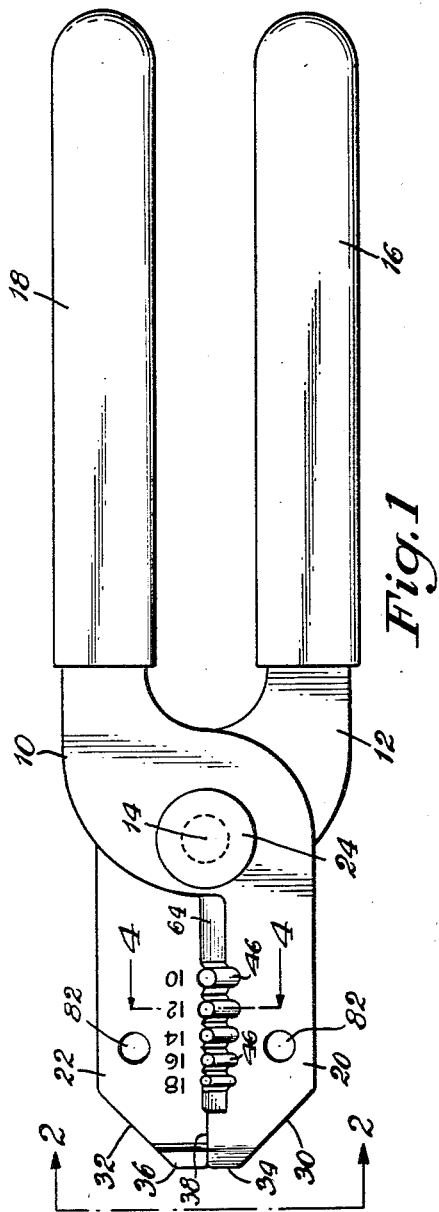
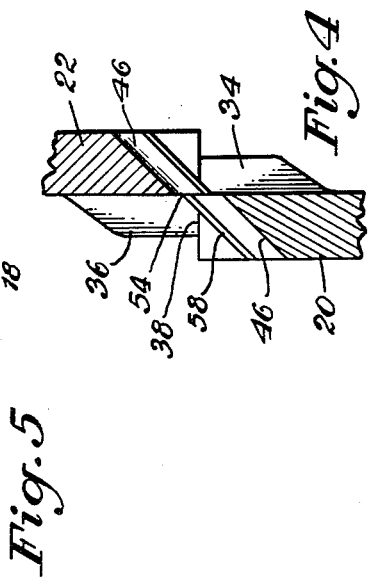
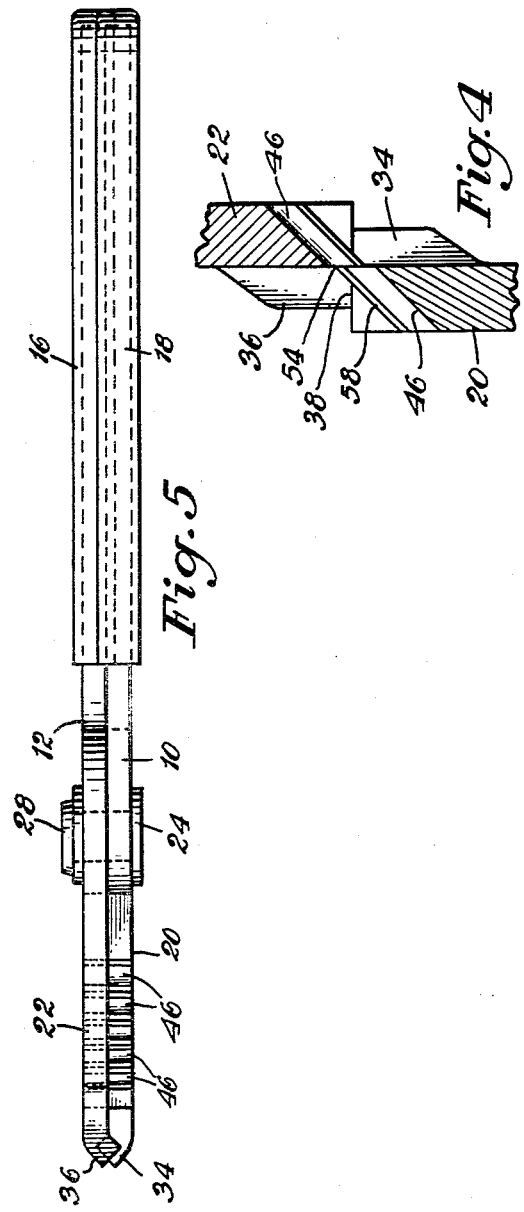
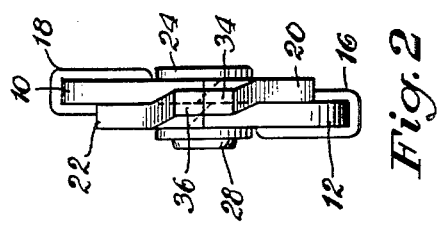
Inventor
Eugene D. Hindenburg
by Parker & Carter
Attorneys United States Patent Office 2,940,343
Patented June 14, 1960

2,940,343
WIRE STRIPPER

Eugene D. Hindenburg, De Kalb, Ill., assignor to Ideal Industries, Inc., Sycamore, Ill., a corporation of Delaware Filed Apr. 26, 1957, Ser. No. 655,357

1 Claim. (Cl. 81—9.5)

This invention is in the field of mechanism for stripping the insulation from electric wires and the like, commonly referred to as wire strippers, and relates to a new and improved inexpensive, but sturdy, manually operable stripper, although many of the features could be used on automatic or bench strippers or other types.

A primary object of my invention is cutting blades for manually operable strippers or the like, which insure proper centering of the insulated wire and therefore prevent nicking of the conductor itself.

Another object is an inexpensive manual stripper which requires only one set of dies, mill cutters or form grinding masters for manufacture.

Another object is a stripper of the above type which eliminates practically all chance for error by the operator.

Another object is a manually operated hand stripper which is practically foolproof and does not need any adjustable stop or other type of adjustment.

Another object is a cutting blade formation for a stripper of the above type which more efficiently cuts the insulation so that the operator may use less cutting force.

Another object is a stripper which may be used to strip insulation from wires covered with almost any type of insulation.

Another object is a manually operated wire stripper which is highly accurate.

Another object is a combination tool, namely, a stripper, wire cutter, wire looper, conduit reamer, and wire gauge.

Other objects will appear from time to time in the ensuing specification and drawings in which:

Figure 1 is a side view of a pair of my wire strippers;

Figure 2 is an end view taken along line 2—2 of Figure 1;

Figure 4 is a section along line 4—4 of Figure 1 with both jaws shown and fully closed; and Figure 5 is a top view of Figure 1.

Figure 3:
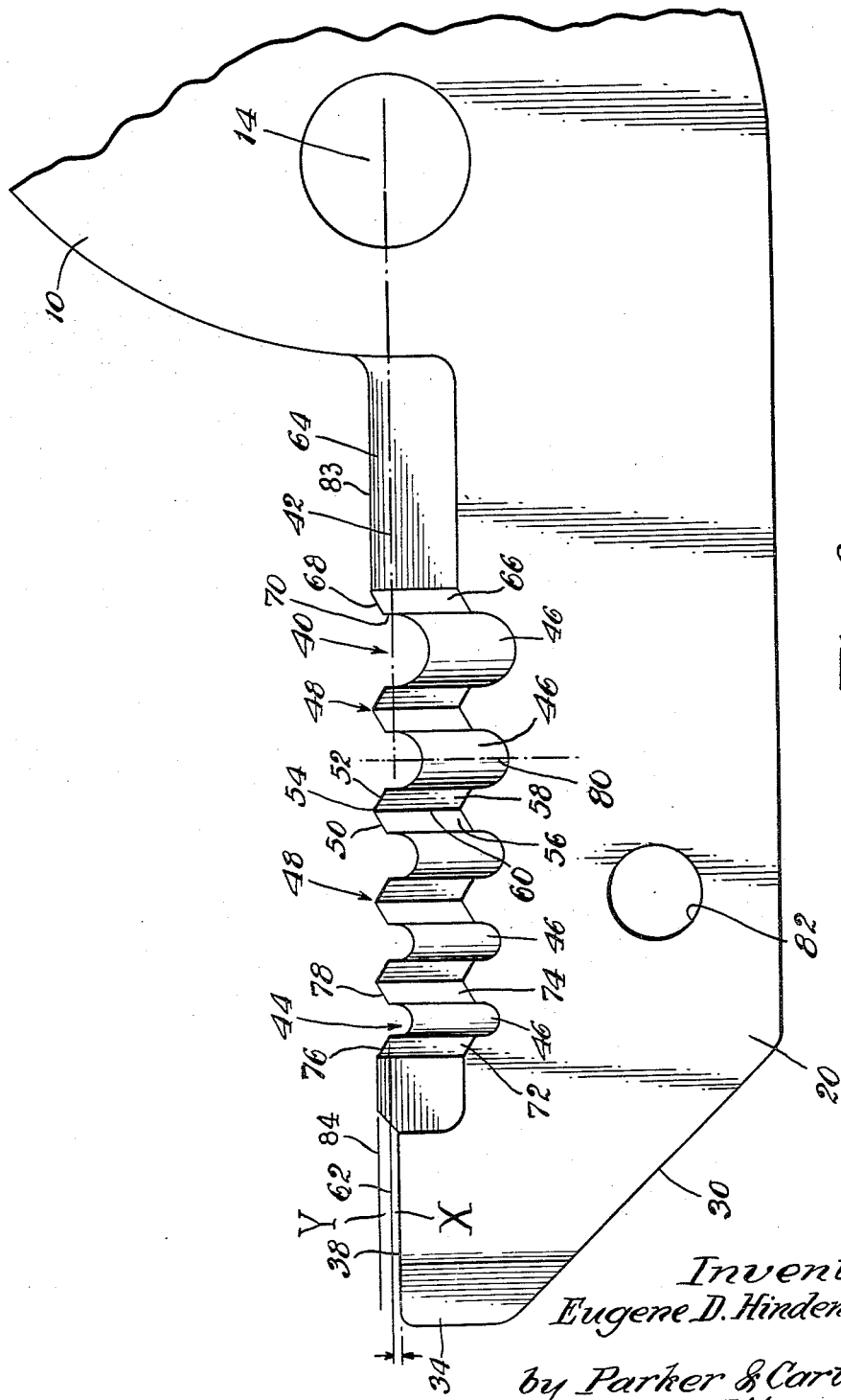
Figure 3 is a side view, similar to Figure 1, of the outside of one of the pivoted members, on an enlarged scale.

In Figure 1 the stripper is shown as composed of two elements or members 10 and 12 pivoted together at 14. The members are formed with handles 16 and 18 on one end which may have plastic coverings or the like. On the other side of the pivot the members are provided with operating jaws 20 and 22.

As shown in Figure 5, each of the members is substantially flat and relatively thin. The pivot may take the form of a headed rivet 24 with a washer on the side away from the head. The shank of the rivet may be rolled back or upset as at 28 to secure the members together.

As shown in Figure 1, the jaw portions are provided with operating surfaces, to be described in detail hereinbelow, which, because the members 10 and 12 are substantially flat, scissors past each other instead of abutting, thereby giving the most efficient insulation cutting action. The ends of the jaw portions are tapered or beveled at 30 and 32 down to nose portions 34 and 36, each of which is bent in at approximately a 45° angle, as shown in Figure 5, so that the end surfaces of the bent-in nose portions line up endwise, as shown in Figure 2. When the jaws are closed, the end surfaces 30 and 32 may be used to ream a conduit. The inner or opposed areas of the nose portions are substantially flat, such as indicated at 38 in Figure 3, so that a full, firm abutment is acquired between the two nose portions to define the maximum closed position of the jaws.

The operating jaws for each member are provided with what I shall refer to as a plurality of knife edge notches, indicated for example at 40, which are semicircular in cross section in a plane generally parallel to the side faces of the jaws. The development of the semicircular notches into circles, of varying size, would produce a line 42 running through their centers and through the center of the pivot 14 and coplanar with the area or surface 38 on the abutting nose. The cutting circles or notches vary in size, the largest closest to the pivot and thereafter uniformly decreasing in size to the smallest, indicated at 44, remote from the pivot, although it might be varied somewhat.

As shown in Figure 4, each notch has a lateral groove that falls away from the cutting edge on a dihedral of approximately 45° in the form of a semi-elliptic channel 46. I prefer that each such channel have a uniform diameter in cross section parallel to the side faces of the jaws, the same as its knife-edge notch. The knife-edge notch is formed on the inside surface of the member, meaning the surface that scissors against the other member.

The notches are separated by intermediate ridges, such as indicated generally at 48. Each such ridge is made up of two coplanar, convergent, insulation cutting edges 50 and 52 which intersect at an intermediate or high point 54. The angle of the insulation cutting edges 50 and 52 is shown as perferably on the order of 120° so that the high or leading point 54 is generally midway between the sides. But it might be otherwise. Thus, the opening angle of the cutting edges on each side of a notch may be also approximately 120°. I prefer that the insulation cutting edges be all coplanar with the notches and disposed longitudinally. From each such pair of edges between adjacent notches, lands surfaces, such as at 56 and 58, lead laterally away and down at approximately the same angle as the channels from the cutting notch. Two such lands surfaces intersect longitudinally in a lateral apex straight edge 60.

The lands surfaces and insulation cutting edges that make up the intermediate ridges rise, at the edges 50 and 52, for example, slightly above the centerline 42 of the center of the notch circles. In Figure 3, the line 62 running through the lower end of each and all of the cutting edges, such as at 50 and 52, is spaced a predetermined distance, indicated generally at X, above but parallel to the centerline 42 running through the center of the notch circles.

Between the pivot 14 and the first cutting circle or notch, I provide a substantial knife edge 64, the leading edge 83 of which is generally aligned with the high point, such as at 54, of all of the cutting edges of the intermediate ridges between the notches along line 84. Thus, line 62 is spaced from line 84 by a distance Y. Similarly, I provide a lateral lands surface 66 and a leading or cutting edge 68 between the first notch and the knife edge.

Because of the distance X between the line of centers 42 of the cutting notches and the line 62, parallel to it and running through the lower end of the cutting edges, the cutting notches are deepened. Refer to the largest notch, for example. This is to say that the lower portion of each notch will be semicircular, the sides of the notch flow tangentially into a straight edge portion 70 at the line of centers 42. The straight edge portion, as indicated at 70, rises the distance X, until it intersects the insulation cutting edge 68.

During manufacture, a warpage problem may occur. I prefer to use a high carbon steel which I heat treat to harden the blades all the way through, not just a surface hardening. When the blanks are quenched, they may warp. I grind them on a surface grinder, for example, which has a magnetic chuck. Such a chuck will tend to pull each of the blanks down flat, but during grinding the stresses will be relieved irregularly. When each blank is removed from the chuck, it tends to return to its slightly warped condition. I prefer to grind each blank, say, from the area of the plastic handle cover behind the pivot hole to the nose portion. In any event, the blades have a tendency to hit or bind when the stripper is assembled, due to the warpage. The irregularity caused by the notches and grooves will prevent a smooth scissors action of one blade sliding smoothly along the other.

Therefore, I relieve, by grinding, filing or otherwise, a few thousandths of an inch of metal from the "hole" side of each blade, meaning the opposed inner surfaces, so that, in use, one will cam by the other. The amount removed is so small that it does not show, for example, in Figure 4, but in actual practice, it might be large.

The use, operation and function of my invention are as follows:

I provide a simple, highly reliable, manually operable stripper, but many of the features could be used on power units.

The two members or elements are pivoted together, and they may be identical. Accordingly, only one set of dies, mill cutters, or form grinding masters are necessary and any two members may be fastened together for a complete tool.

The handles may be covered with plastic, or any other suitable insulation, although this is optional. The nose portions are tapered in and bent at approximately 45° with substantially flat, abutting surfaces, as at 38, to determine the maximum closed position. But they might be on the other side of the pivot.

The cutting circles or notches vary in size running from the largest, closest to the pivot, to the smallest, the most remote from the pivot, so that the maximum leverage is applied to the thickest insulation. The line of centers of the notches, meaning the line 42, running through the center of the notches, is substantially coextensive with the flat abutting surface 38 and also runs through the center of the pivot 14. Each notch has a channel leading away from it at approximately 45°. The lands surfaces on each side of a channel are disposed at approximately 120°. For example, consider the lands surfaces 72 and 74 on each side of the smallest channel. These, in effect, serve as a cradle on each side of the groove or channel so that the operator, with the strippers open, can lay the insulated wire in the cradle for centering and support.

The channels and cutting notches are, in effect, back to back for the two jaw portions. As shown in Figure 1, the markings or indications for wire size will be on the flat inner surface of each jaw member above and related to the proper cutting notch on the other jaw. With the jaws open, the operator picks the proper notch corresponding to the wire size indicated on the flat portion of the inner surface of the upper jaw and cradles the wire in the lands surfaces on each side of the selected channel. If he doesn't know the wire size, he can use the strippers as a gauge. It makes no difference which side of the strippers are up. The strippers may be turned over and operated in the same manner.

The intermediate ridges have the insulation cutting edges 50 and 52 at an angle or dihedral so that they slice instead of tear through the insulation on the wire. The conductor, in theory, will fit into the circle caused by the closed notches of both jaws. The insulation on each side will be sliced by the cutting edges 76 and 78, for example, as shown on the smallest notch in Figure 3. The insulation below and above the conductor is cut by the circular notches. Because of the distance X, the notches may be thought of as, in a sense, countersunk, and when the jaws are fully closed, an overlap of 2 $(X+Y)$ is provided assuring that the insulation is completely severed.

When the jaws are fully closed, the lateral centerline of each channel, such as indicated at 80 for one of the intermediate channels in Figure 3, for one jaw member lines up with or merges with the centerline of the opposite jaw member. When viewed along the centerline 80, the channel will be elliptical with the major axis horizontal and the minor axis vertical. In effect, as shown in Figure 4, one channel forms an extension of the other so that when the jaws are fully scissored together and closed, due to the eccentric distance X, the cutting edges, such as 76 and 78 of the smallest channel in Figure 3, are well overlapped.

The knife edge 64 also rises above the line of center 42 of the knife edge notches by the distance X and Y and, accordingly, substantial overlap is provided, when the members are fully scissored closed, to insure a full cutting.

The strippers are simple, inexpensive, but reliable. They are highly accurate and practically foolproof. The operator may position the insulated wire between the jaws on one side and observe his wire size on the same side. He does not have to be looking at the other side at the same time. The overlap and scissors action insures complete severance of the insulation. The bent-in nose portions insure a positive positioning of the two halves of the stripping hole so that the conductor of the wire is not nicked. I may provide suitable apertures or holes, such as at 82, on each jaw member so that the stripped end of the wire may be inserted and bent into a loop, if desired.

While I have shown and described the preferred form of my invention and suggested several modifications, it should be understood that numerous additional modifications, substitutions, alterations and changes may be made without departing from the invention's fundamental theme. I, therefore, wish that my invention be unrestricted except as by the appended claim.

I claim:

In a device for stripping insulation from wires and the like, a pair of members constructed for relative movement to and from each other, disposed for scissoring action so that portions of each slide by one another, means for connecting the members for such movement, opposed operable jaws on the members, the said jaws having abutting nose portions defining a closed position of the jaws, at least one semi-circular knife edge notch on each jaw opposite a corresponding notch on the other jaw, the notches being on the inside surface of each jaw so that they are directly adjacent each other in the closed position, a semi-circular channel inclined laterally away from each notch with the channel of one notch being the rectilinear extension of the channel of the corresponding notch in the opposite jaw in the closed position, each notch having 180° of peripheral extent, the knife edge notches being slightly countersunk with the sides of the countersink parallel to each other and tangentially intersecting the edges of the 180° notch so that when the jaws are in a closed position, the axes of the channels of opposed notches will be coincident and the opposed notches will define a circle, sloping surfaces on each side of and adjacent each channel intersecting the inside surface of each jaw in generally coplanar convergent insulation cutting edges above the countersink, each sloping surface being bounded by an apex straight edge, the angle of the semi-circular channels, sloping surfaces and apex straight edges being generally equal.

References Cited in the file of this patent

UNITED STATES PATENTS

| | | |
|---|---|---|
| 941,192 | Goodridge | Nov. 23, 1909 |
| 1,675,838 | Bernard | July 3, 1928 |
| 1,924,837 | Crause | Aug. 29, 1933 |
| 2,668,464 | Paules | Feb. 9, 1954 |

FOREIGN PATENTS

| | | |
|---|---|---|
| 682,647 | France | Feb. 17, 1930 |